(12) United States Patent
Kouters et al.

(10) Patent No.: US 7,465,393 B2
(45) Date of Patent: Dec. 16, 2008

(54) MEMBRANE FILTER WITH DEAERATION AND METHOD FOR THE MANUFACTURE THEREOF

(75) Inventors: Lucas Johannes Cornelis Kouters, Alphen aan de Rijn (NL); Marc Johannes Fleuren, Utrecht (NL); Ingo Blume, Hengelo (NL)

(73) Assignee: Norit Proces Technologie Holding B.V., Zenderen (NL)

( * ) Notice: Subject to any disclaimer, the term of this patent is extended or adjusted under 35 U.S.C. 154(b) by 223 days.

(21) Appl. No.: 10/836,611

(22) Filed: Apr. 30, 2004

(65) Prior Publication Data
US 2005/0000883 A1    Jan. 6, 2005

(30) Foreign Application Priority Data
May 2, 2003    (NL) .................................... 1023332

(51) Int. Cl.
*B01D 63/04* (2006.01)
*B01D 61/14* (2006.01)
*B01D 63/00* (2006.01)
(52) U.S. Cl. ............................ 210/321.64; 210/321.88; 210/472; 210/436; 210/650
(58) Field of Classification Search ........................ None
See application file for complete search history.

(56) References Cited

U.S. PATENT DOCUMENTS

| | | | |
|---|---|---|---|
| 4,531,954 A | 7/1985 | Klein | |
| 4,568,366 A | 2/1986 | Frederick et al. | |
| 4,636,307 A | 1/1987 | Inoue et al. | |
| 4,828,587 A | 5/1989 | Baurmeister et al. | |
| 5,160,038 A | 11/1992 | Harada et al. | |
| 2003/0164333 A1* | 9/2003 | Nohren et al. | 210/650 |

FOREIGN PATENT DOCUMENTS

| | | |
|---|---|---|
| EP | 0 970 738 | 1/2000 |
| JP | 60 232208 | 11/1985 |
| JP | 03 038231 | 2/1991 |
| JP | 04 298283 | 10/1992 |
| JP | 04 367779 | 12/1992 |
| JP | 09 075692 | 3/1997 |
| NL | 1 020 607 | 11/2003 |
| WO | WO 02 076589 | 10/2002 |
| WO | WO 03 041847 | 5/2003 |

\* cited by examiner

*Primary Examiner*—Krishnan S Menon
(74) *Attorney, Agent, or Firm*—Weingarten, Schurgin, Gagnebin & Lebovici LLP

(57) ABSTRACT

The invention relates to a method for manufacturing a membrane filter, comprising the steps of:
  fixing a bundle of hydrophilic filter elements by at least a first end in a housing part to be called bottom element, such that the first end of the hydrophilic filter elements is open towards a first side of the housing part and the hydrophilic filter elements extend on the opposite side of the housing part; and
  subsequently providing for at least one watertight and air-permeable element, in particular a hydrophobic filter element.

34 Claims, 9 Drawing Sheets

MEMBRANE FILTER WITH DEAERATION AND METHOD FOR THE MANUFACTURE THEREOF

This application claims priority to a Dutch application No. NL 1023332 filed May 2, 2003.

The invention relates to a method for manufacturing a membrane filter. The invention relates in particular to a method for manufacturing a membrane filter for water or water-containing fluids. Such filters are used, for instance, for capturing, from water, particles, traces, bacteria, viruses and like contaminations, as inter alia for providing Legionella-free water. Such a membrane filter is known, for instance, from WO 02/076589.

In this known membrane filter, a substantially cylindrical housing is provided, equipped with a water inlet and a water outlet. Between the water inlet and water outlet, a bottom plate is provided, in which at least first ends of a bundle of water filtering hollow fibers are fixed. These fibers are hydrophilic. Water that flows through this housing during use can only flow from the water inlet to the water outlet through the wall of the fibers. As a result, contamination, for instance in the form of bacteria, is filtered out of the water.

This known membrane filter has as a disadvantage that air collects in the housing as a result of the fact that the hydrophilic fibers, once wet, allow water but no air to pass. As a result, during use, an air bubble is formed in the housing, which renders the membrane filter largely inoperative. As a result, such a filter may become inactive for instance for 80% or more.

It has previously been proposed, in such a membrane filter, to include a hydrophobic membrane in the bundle of hydrophilic elements, through which, conversely, air but no water can escape. Such a solution has as an advantage that the air can escape, but has as a disadvantage that testing the membrane filter is complicated and time-consuming. For such testing, first the hydrophobic membrane should be tested, with water, to which end the hydrophobic membrane is to be identified within the bundle. Subsequently, this hydrophobic membrane should be closed off, at least on the side of the bottom plate, after which the filter is filled with water and is tested for airtightness. Since these hydrophobic membranes cannot be traced in a mechanized manner, this is a complicated and time-consuming procedure to be executed manually.

The invention contemplates a method for manufacturing a membrane filter, in which the above-mentioned disadvantages of the known methods are at least partly avoided.

The invention more particularly contemplates the provision of such a method with which membrane filters can be manufactured that have a deaeration possibility.

The invention further contemplates the provision of such a method with which membrane filters can be manufactured relatively fast and simply and preferably in a mechanized manner.

At least a number of these and other objects are realized with a method according to claim 1.

In a method according to the present invention, a bundle of hydrophilic filter elements are fixed by at least one first end in a bottom element. This is commonly denoted as potting.

After potting, an air-permeable watertight element is provided, so that during use air can escape without the filtering action of the membrane filter being adversely affected. Preferably, to that end, a hydrophobic filter element is provided, manufactured and/or cleared.

In this description, a hydrophilic filter element should be understood to mean at least a filter element which, at service pressure, allows water but no air to pass. In this description, hydrophobic filter element should be understood to mean at least a filter element which, at service pressure, allows air but no water to pass.

Preferably, a method according to the invention is furthermore characterized by the features according to claim 6.

After potting, the connection between the filter elements and the bottom element is tested for air leakage, while moreover the airtightness of the fibers themselves is tested. In this way, defective, leaking fibers can be identified. This is preferably done under wet conditions, that is, the bottom part and the filter elements are held under water and subsequently checked for air bubbles. Only upon proven airtightness is the at least one watertight and air-permeable element, in particular a hydrophobic filter element, provided.

As in this embodiment of a method according to the present invention, a watertight and air-permeable filter element such as a hydrophobic filter element is not provided for until after testing, the airtightness of the potting of hydrophilic filter elements can be tested particularly simply and uniformly. The reason is that, in contrast with the known method, there is no need first to trace and close off a hydrophobic filter element. As a consequence, a method according to the invention can be carried out relatively fast and simply, in an economical manner, and, if desired, be mechanized simply. Moreover, if the potting is not airtight, at least not sufficiently so, it is possible to refrain from providing for the or each hydrophobic filter element.

In a method according to the present invention, advantageously, the or each watertight and air-permeable element can be provided for by hydrophobing at least a portion of at least one hydrophilic filter element. In this way, the advantage is achieved that in the housing of the membrane filter, in particular the bottom part, no special provisions need to be arranged.

Hydrophobing a hydrophilic filter element can be done, for instance, by applying a hydrophobing agent, in particular a liquid, on the outside of at least a portion of at least one hydrophilic filter element, for instance adjacent the potting or, conversely, remote therefrom. Alternatively, or in addition, it is also possible to apply such a hydrophobing agent on the inside of at least one hydrophilic filter element. It is then particularly advantageous if this agent, as a liquid, is applied in the or each respective hydrophilic filter element from the first ends.

Use of hydrophobing agents such as liquid for obtaining the or each hydrophobic filter element by hydrophobing at least a portion of at least one hydrophilic filter element provides the advantage that the structure, in particular the pore structure, and hence the transmissivity of the hydrophilic and hydrophobic filter elements will remain substantially equal, which is advantageous for the flow characteristic and the resistance of the membrane filter. Moreover, no extra parts need to be used.

For hydrophobing hydrophilic filter elements, according to the invention, for instance a substance can be selected from the group of substances such as PTFE, silicone, Fluorepel™ and the like, while as hydrophilic filter elements for instance fibers can be used that are manufactured from the group of Polysulfone, Polyethersulfone/PVP and the like, which are only mentioned by way of example, As regards usable hydrophilic filter elements and methods for the manufacture thereof, reference is further made to the literature, for instance the above-mentioned international patent applications WO 02/076589 and US2002/0139095, incorporated herein by reference.

In an alternative embodiment, a method according to the invention is characterized by the features according to claim 7.

In such a method, in a housing for the membrane filter, at least one watertight but air-permeable element such as the hydrophobic filter element mentioned is arranged, preferably after the potting of the hydrophilic filter elements has been tested and found to be in order. Such a method can be carried out mechanically in a particularly simple manner and the position of the or each watertight but air-permeable element is always uniformly fixed. Moreover, the advantage thus achieved is that the position where air can leave the respective housing can be chosen freely, also remotely from the position where water will leave the housing.

In a particularly advantageous embodiment, the watertight and air-permeable filter element is arranged in the bottom part, in that part in which the first ends of the hydrophilic filter elements are included.

Preferably, the hydrophilic filter elements are arranged adjacent an outer circumference of the bottom part, thereby leaving clear a central part of the bottom part, after which the bundle of hydrophilic filter elements is wound into a coil shape with a free inner space therein. This inner space is preferably contiguous to the central part mentioned, after which hydrophobing of at least a portion of the hydrophilic elements is obtained from the inner space. Alternatively, in addition to or instead of hydrophobing at least a portion of the hydrophilic filter elements, the watertight and air-permeable element such as the hydrophobic filter element can be arranged in the central part.

By winding the bundle of hydrophilic filter elements in a coil shape, thereby leaving clear the free inner space, the advantage is achieved that the inner space renders the hydrophilic filter elements accessible in a relatively simple manner, as well as the bottom part, while yet a relatively large filtering surface area is obtained.

In a filter membrane according to the present invention, advantageously, use can be made of bacteria retaining and/or killing means and/or further filtering means, such as activated carbon, zeolites, clay materials, compounds having a controlled release of active substances, pH controlling agents, ion exchanging substances, minerals, iodide, disinfectants and the like, which can function as pre-filter and moreover, for instance, can largely prevent undesired changes in odor and/or taste of the water or have such filtering action known per se.

The invention further relates to a membrane filter characterized by the features according to claim 16.

Such a membrane filter provides the advantage that air can simply escape while the filtering action thereof is preserved.

The invention further relates to a shower, at least shower head and/or shower hose, provided with a membrane filter according to the invention, at least a filter membrane manufactured with a method according to the invention.

By providing a shower, at least shower head and/or shower hose, with a membrane filter according to the invention, the advantage is achieved that contamination such as bacteria, in particular Legionella, is captured adjacent the position where a user might come into contact with the water In this way, a particularly good and simple purification of the water is obtained, also of water that, for instance, has been stagnant for some time in piping.

In the subclaims, further advantageous embodiments of a method, membrane filter and shower according to the invention are set forth.

To clarify the invention, exemplary embodiments thereof will be further elucidated with reference to the drawing, wherein:

FIG. 1 schematically shows in side elevation an embodiment of a membrane filter according to the invention, in a housing;

Figure 7:
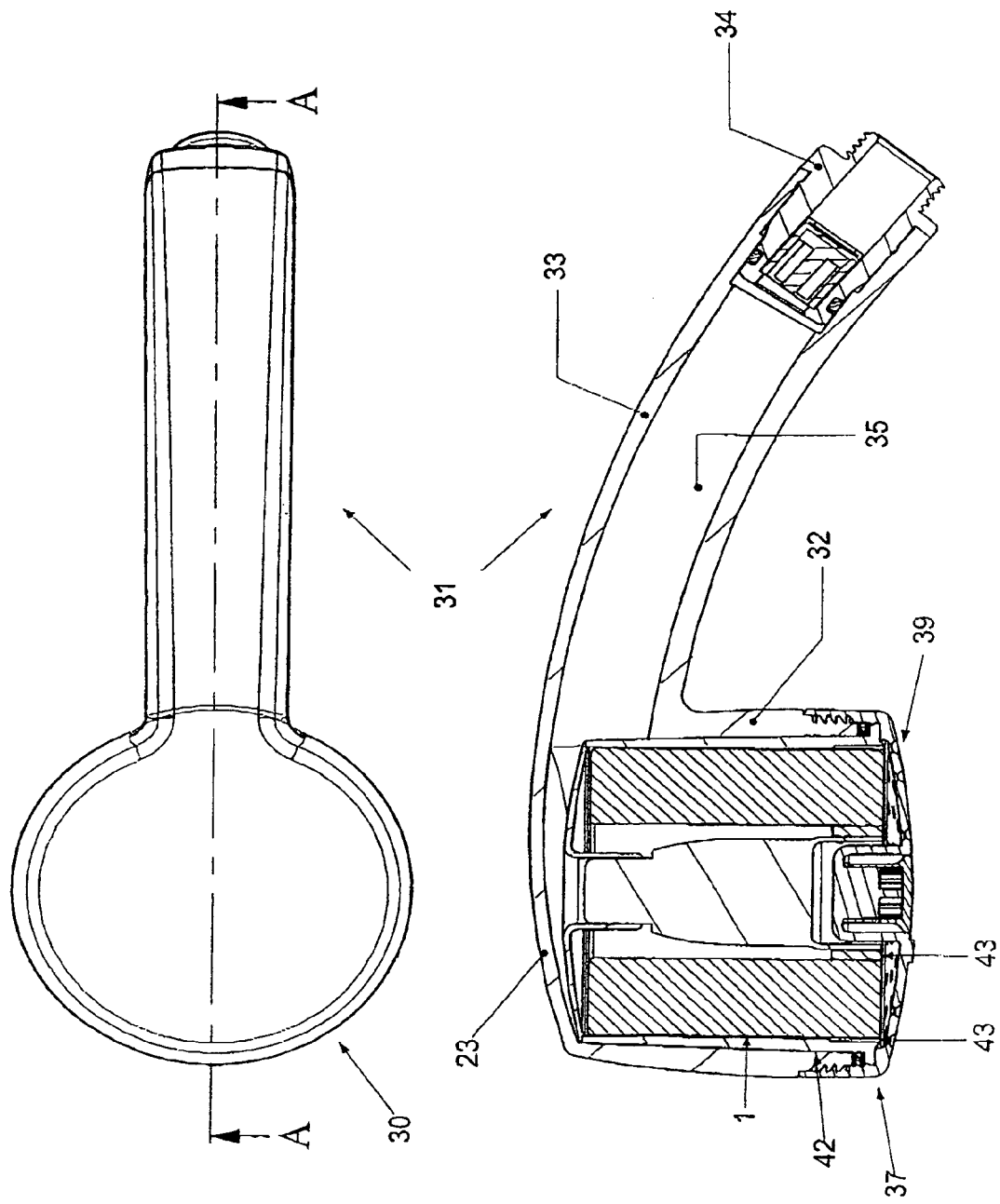
Figure 8:
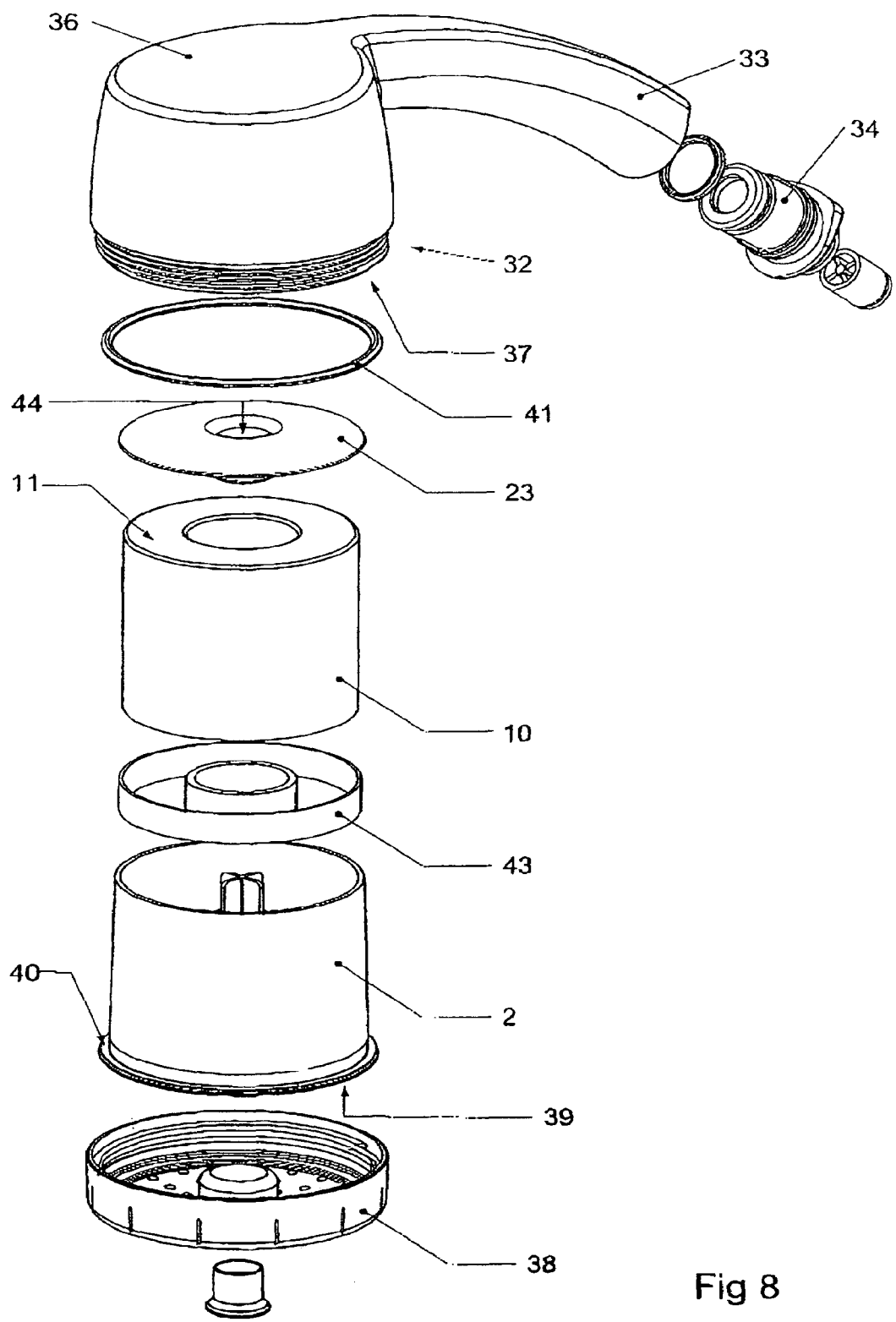
Figure 9:
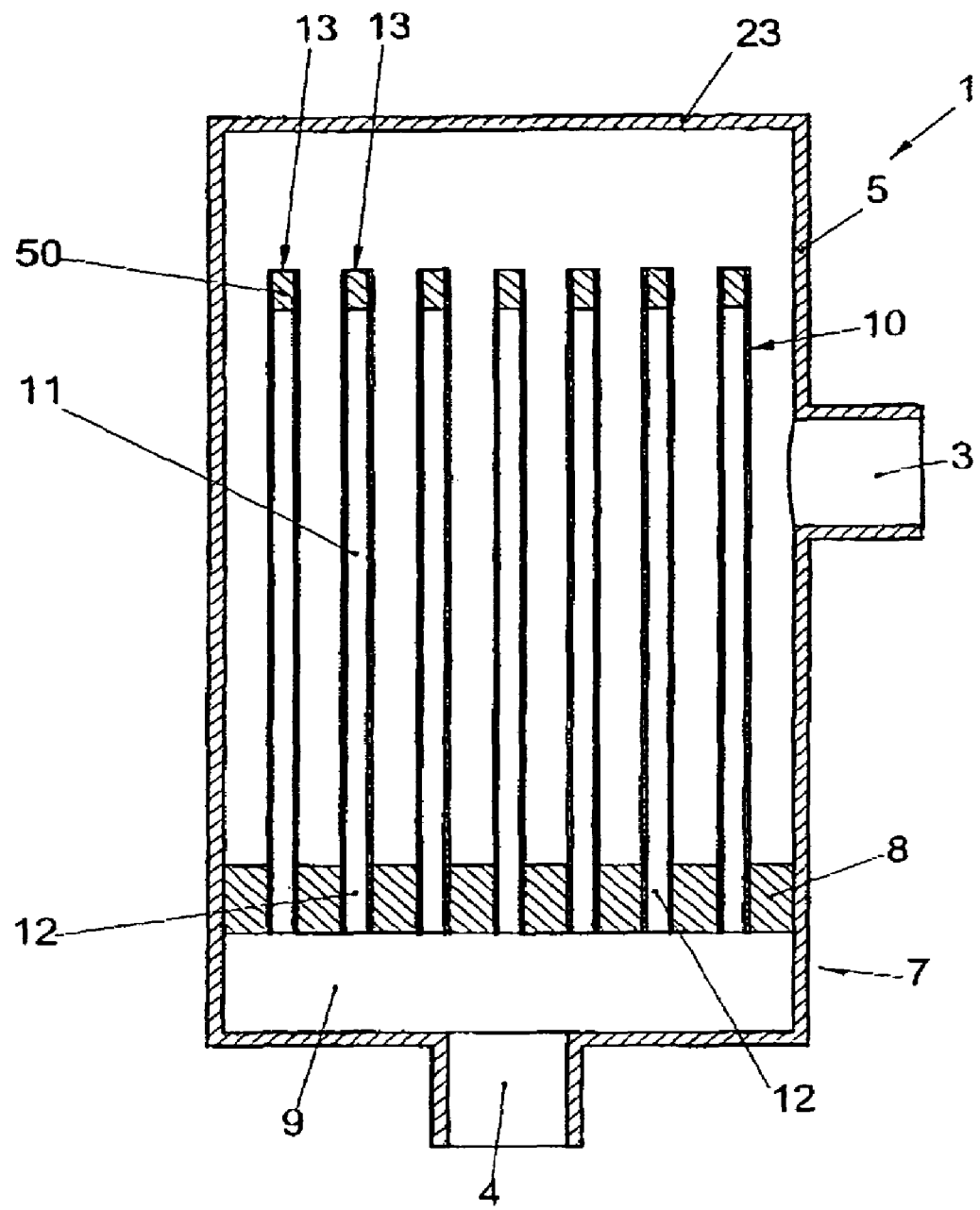

FIG. 7 schematically shows a shower head provided with a membrane filter according to the invention, in top plan and sectional view; and FIG. 8 schematically shows an exploded view of a shower head according to FIG. 7;

FIG. 9 shows an alternative embodiment of a filter; and

Figure 10:
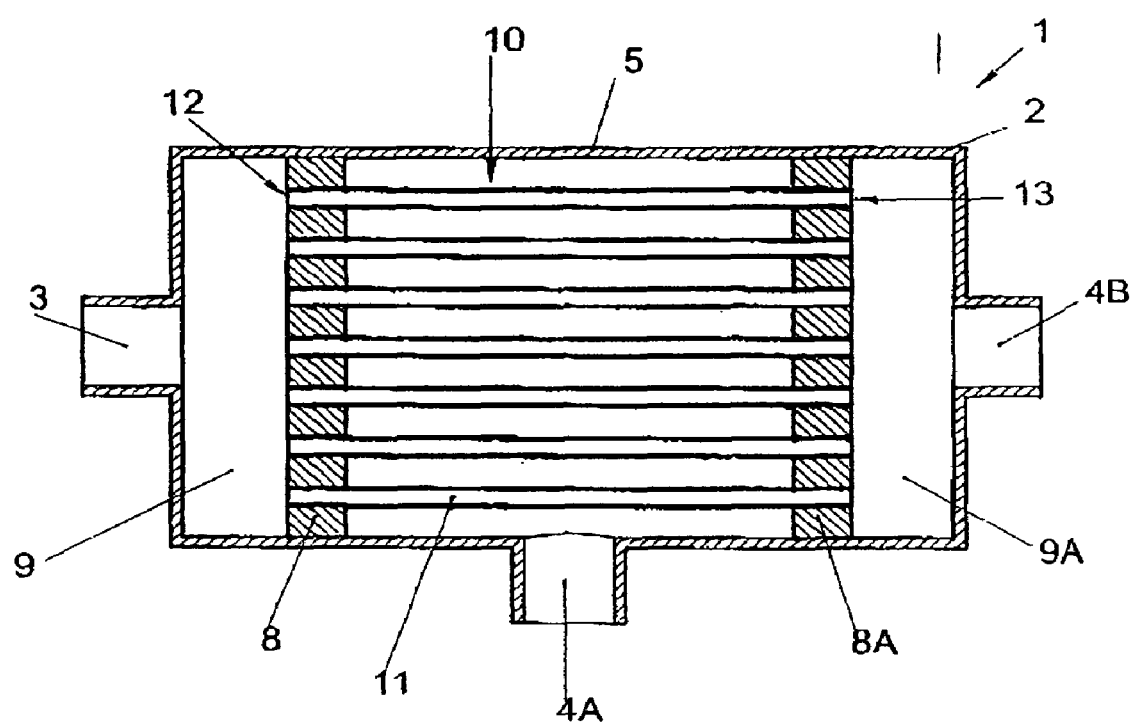

FIG. 10 shows a further alternative embodiment of a filter according to the invention.

In this description, the same or corresponding parts have the same or corresponding reference numerals. In this description, hydrophilic filter element is understood to mean at least a filter element which allows water to pass but stops air and bacteria. In this description, hydrophobic filter element is understood to mean at least a filter element which allows air to pass and stops water and bacteria.

Materials for the manufacture of such filter elements are sufficiently known from practice, such as described, for instance, in the introduction and in WO021076589 and US2002/0139095, incorporated herein by reference but not limited thereto. Suitable in particular, and shown in the drawing, are microporous hollow fiber membranes, for instance manufactured from PES or PVDF or the materials described earlier. Such microporous hollow fiber membranes are described, for instance, in WO 02/076589 and US2002/0139095 and the publications mentioned therein, as well as methods for the manufacture thereof, which are understood to be incorporated herein, at least in that respect.

Figure 1:
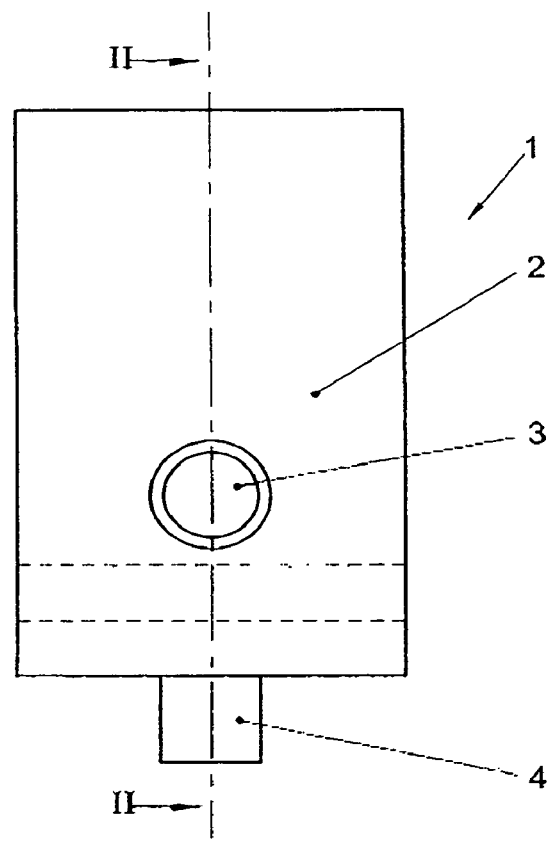

FIG. 1 shows, in side elevation, a membrane filter 1 according to the invention, provided with a housing 2 having a water inlet 3 and a water outlet 4. The housing 2 is watertight and airtight, apart from the water inlet 3 and water outlet 4, and can be included, for instance, in water piping, shower apparatus, bathing apparatus, spraying apparatus or the like. In FIGS. 2-6, 9 and 10, different embodiments of such a membrane filter 1 according to the invention are shown, in longitudinal cross-section.

Figure 2:
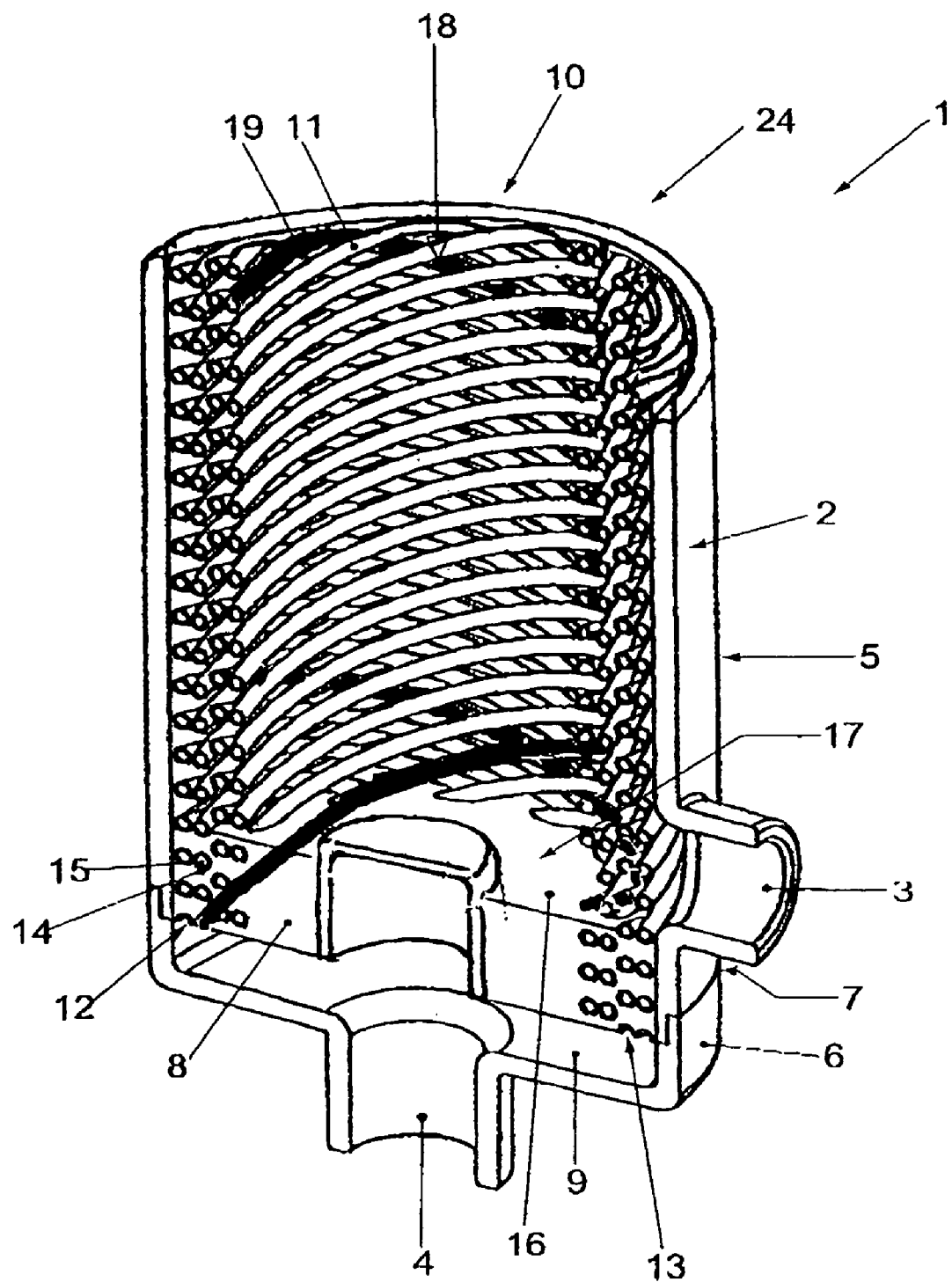
FIG. 2 shows in sectional, perspective view along the line II-II in FIG. 1 a filter according to the invention in a first embodiment.

FIG. 2 shows a first embodiment of a membrane filter 1 according to the invention, with the top removed, in which the housing 2 is substantially cylinder-shaped and is made up substantially of two parts, viz. a jacket 5 on which the water inlet 3 is provided and an end piece 6 on which the water outlet 4 is provided. Provided adjacent the first end 7 of the jacket 5, facing the end piece 6, is a bottom part 8 watertightly and airtightly closing off the jacket 5 at the first end 7. In the end piece 6, under the bottom part 8, a collecting chamber 9 is provided, which is in open communication with the water outlet 4.

Fixed in the bottom part 8 is a bundle 10 of hydrophilic filter elements 11. The hydrophilic filter elements 11 are hollow, porous fibers as described earlier, which are included by a first end 12 as well as a second end 13 in the bottom part 8 and are open towards the collecting chamber 9. Water that flows during use via the water inlet 3 in the jacket 5 into the membrane filter 1 can only flow to the collecting chamber 9 by flowing via the wall 14 of the hydrophilic filter elements 11 into the hollow core 15 of the fibers and flowing therethrough, via the first end 12 or second end 13 thereof, to the collecting chamber 9 and hence to the water outlet 4. Owing to the porous, filtering wall 14, only water can flow away via the collecting chamber 9, whereas, for instance, air and bacteria are stopped by the hydrophilic fibers 11. The bundle 10 of elements 11 has been wound into the shape of a coil, such that the bundle 10 extends along the inside of the jacket 5, thereby leaving clear a central part 17 of the bottom part 8 and an inner space 18 which is substantially cylindrical and is contiguous to the central part 17.

The hydrophilic filter elements 11 are secured by their first and/or second end 12, 13 in the bottom part 8, for instance by forming the bottom part 8 around the ends of the fibers 11, for instance from epoxy. This is commonly denoted as potting. In view of the function of the membrane filter 1 it is of great importance that potting is done in such a way that no air and/or water can flow past the hydrophilic elements 11 and the bottom part 8 from the water inlet to the water outlet 3, 4 without thereby passing the porous wall 14 of the filter elements 11. In order to be able to check this, such a membrane filter is tested according to the invention in a manner as will be described further hereinafter. If this test proceeds successfully, that is, no leakage of air and/or water is established, then, according to the invention, at least one air-permeable and water- and bacteria-stopping second filter element 19 is provided, in particular a hydrophobic filter element 19, schematically indicated in FIG. 2 by a dark-colored fibrous element. The manners in which this can be realized according to the invention will be further elucidated hereinafter.

Figure 3:
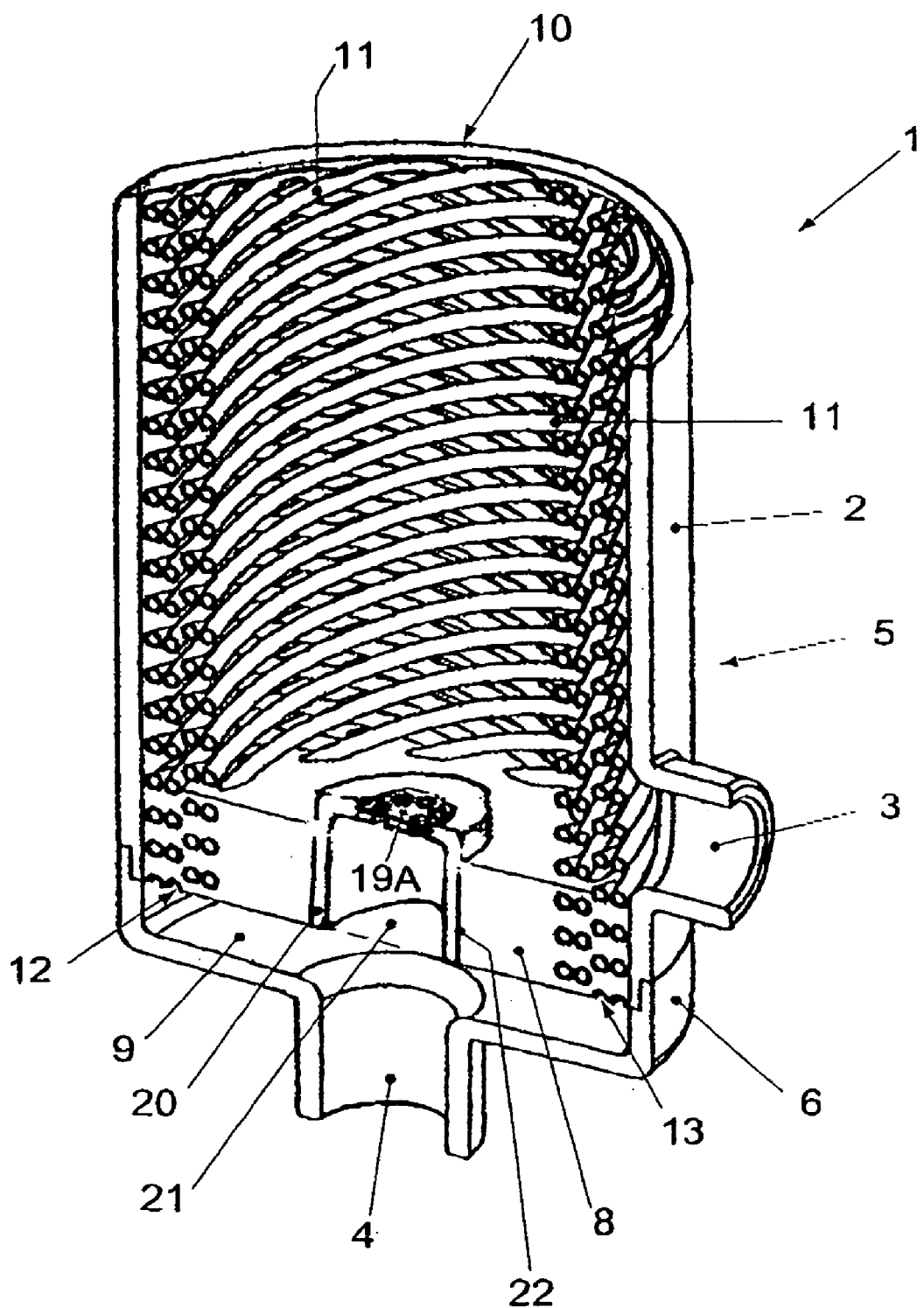
FIG. 3 shows a filter in a similar view to FIG. 2 in an alternative embodiment.

FIG. 3 shows a membrane filter 1 according to the invention which corresponds in structure and function to that as shown in FIG. 2. In this embodiment, however, in the bottom part 8, preferably in the central part 17 thereof, a hydrophobic membrane 19A is provided for passing air and stopping water and bacteria and like contamination. This hydrophobic membrane 19A is preferably arranged, in accordance with a method according to the invention, after the potting of the bundle 10 of hydrophilic filter elements 11 has been tested and found to be in order. In a first embodiment, this can be done by providing the membrane 19A in the bottom part 8 prior to testing and temporarily closing it off with a plug during testing. In FIG. 3, to that end, the hydrophobic membrane 19A has been arranged in a hollow bush 20 which has been secured in an opening in the bottom part 8 or is integral therewith. A plug 21, schematically indicated in FIG. 3 by a dotted line, can then be inserted into the hollow bush 20 to close off the hydrophobic membrane 19A. After testing of the hydrophilic membranes 11, at least the potting thereof, the plug 21 can then be removed to clear the hydrophobic membrane 19A.

In an alternative embodiment, the bush 20 in FIG. 3 can be replaced, during the testing of the potting of the hydrophilic membranes 11, with a plug 21 which, at least temporarily, closes off the opening 22 watertightly and airtightly. After the potting has been tested and found to be in order, the plug 21 is removed and replaced with the bush 20. Optionally, this can be done via the water outlet 4 but it is preferred that the end piece 6 is not fitted until after the potting has been tested and the hydrophobic membrane 19A has been provided.

Figure 4:
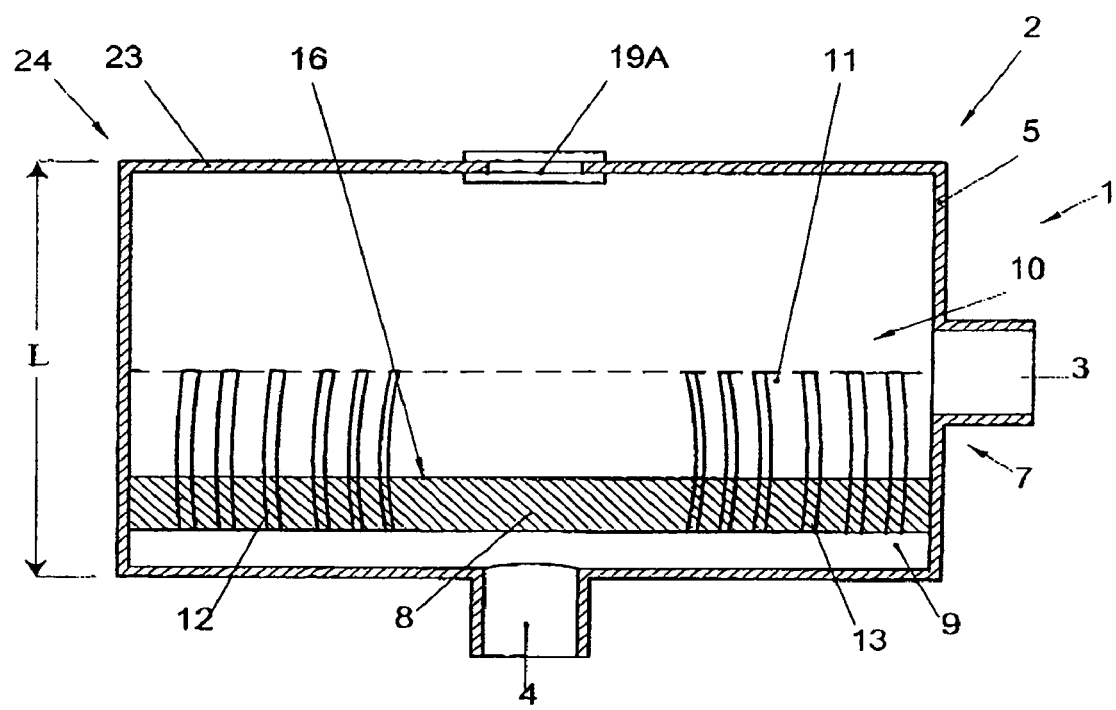
FIG. 4 shows in cross section a second alternative embodiment of a filter according to the invention.

FIG. 4 schematically shows a membrane filter 1 according to the invention of a relatively small axial length L, whose structure is otherwise substantially comparable to that of the membrane filters 1 according to FIGS. 1-3. For simplicity, of the bundle 10 of hydrophilic filter elements 11, only the first and second ends 12, 13 are shown. In this embodiment, in a cover 23, which closes off the second end 24 of the housing 2 situated opposite the first end 7, an air-permeable and watertight, in particular hydrophobic membrane 19A is provided, remote from the bottom part 8. This hydrophobic membrane 19A can be fitted in a manner comparable to the manner as described with reference to FIG. 3, after the potting of the hydrophilic membranes 11 has been tested.

It is noted that the filtering devices 1 according to FIGS. 2 and 3 can also be closed off at the second end 24 with the aid of a cover 23 (not shown).

Figure 5:
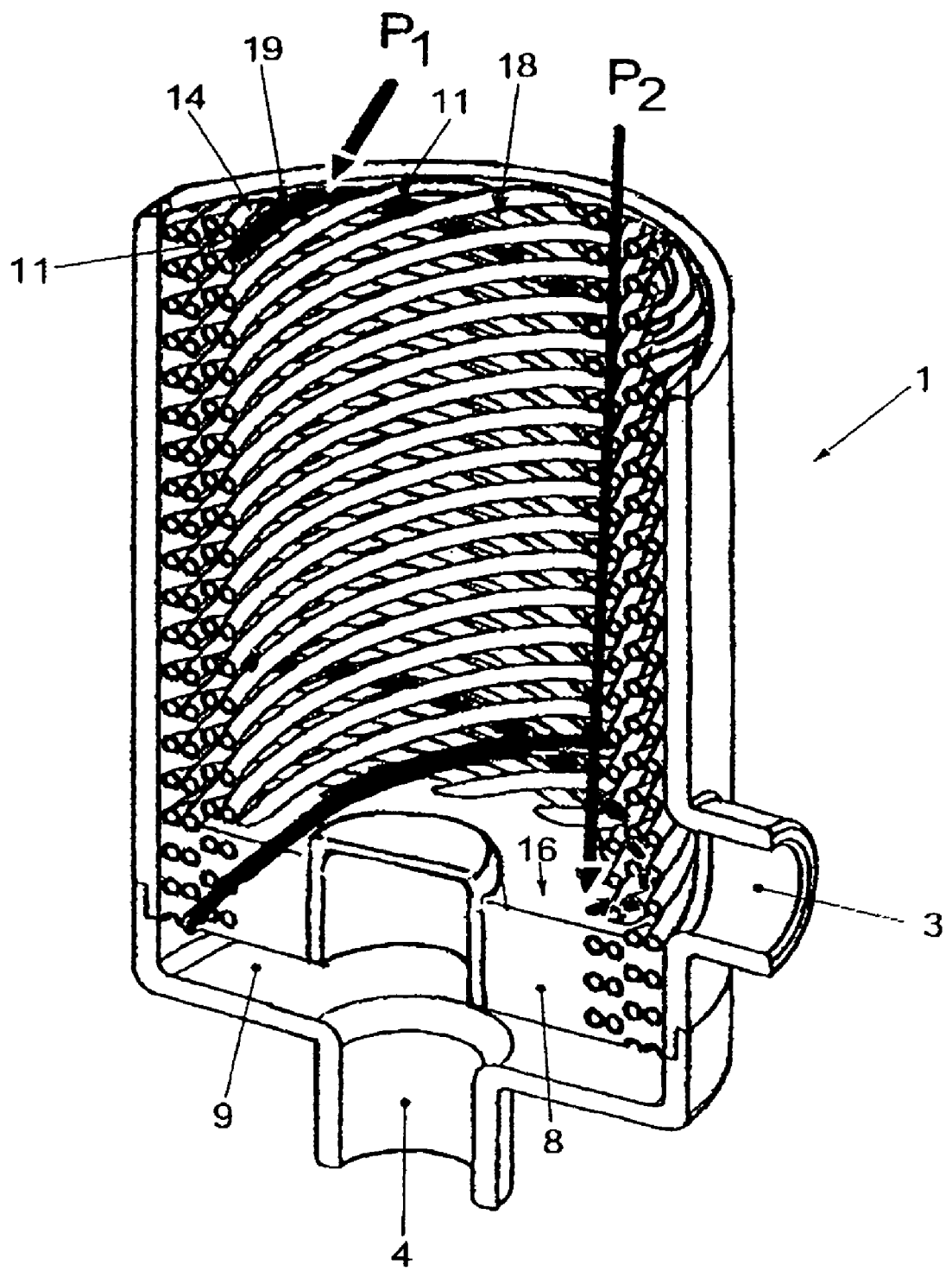
FIG. 5 shows a view of a membrane filter according to FIG. 2, representing two alternative manners of hydrophobing hydrophilic fibers.

FIG. 5 shows two variants of methods according to the invention for hydrophobing hydrophilic filter elements 11, preferably after their potting in the bottom part 8 has been tested and found to be in order. It is indicated by arrow P1 that from the top, that is, before the cover 23 is fitted, a hydrophobing material, in particular a liquid, can be applied with, for instance, a dripper, needle, spray or brush or the like, to the outside of the porous wall 14 of a hydrophilic fiber membrane 11, as a result of which it changes into a hydrophobic filter element 19. Thus, a hydrophobic membrane is obtained through which air can escape to the collecting chamber 9 and, during use, can leave the membrane filter 1 along with the water via the water outlet 4. It will be clear that in this way one or more hydrophilic filter elements can be provided wholly or partly on the outside thereof with such a liquid for hydrophobing them.

In FIG. 5, it is indicated by the arrow P2 that via the inner space 18 at least portions of hydrophilic filter elements 11 bounding the inner space 18 can be treated with such a hydrophobing material, in particular liquid, for instance with the aid of a relatively long needle.

With this method described with reference to FIG. 5, it is also possible, for instance, to provide annular hydrophobic membrane parts 19 on different hydrophilic filter elements 19, for instance right above the main face 16 of the bottom part 8. With the aid of these methods, the ratio between the total surface area of the hydrophilic filter elements 11 and the surface area of the or each hydrophobic filter element 19 can be chosen as desired.

Figure 6:
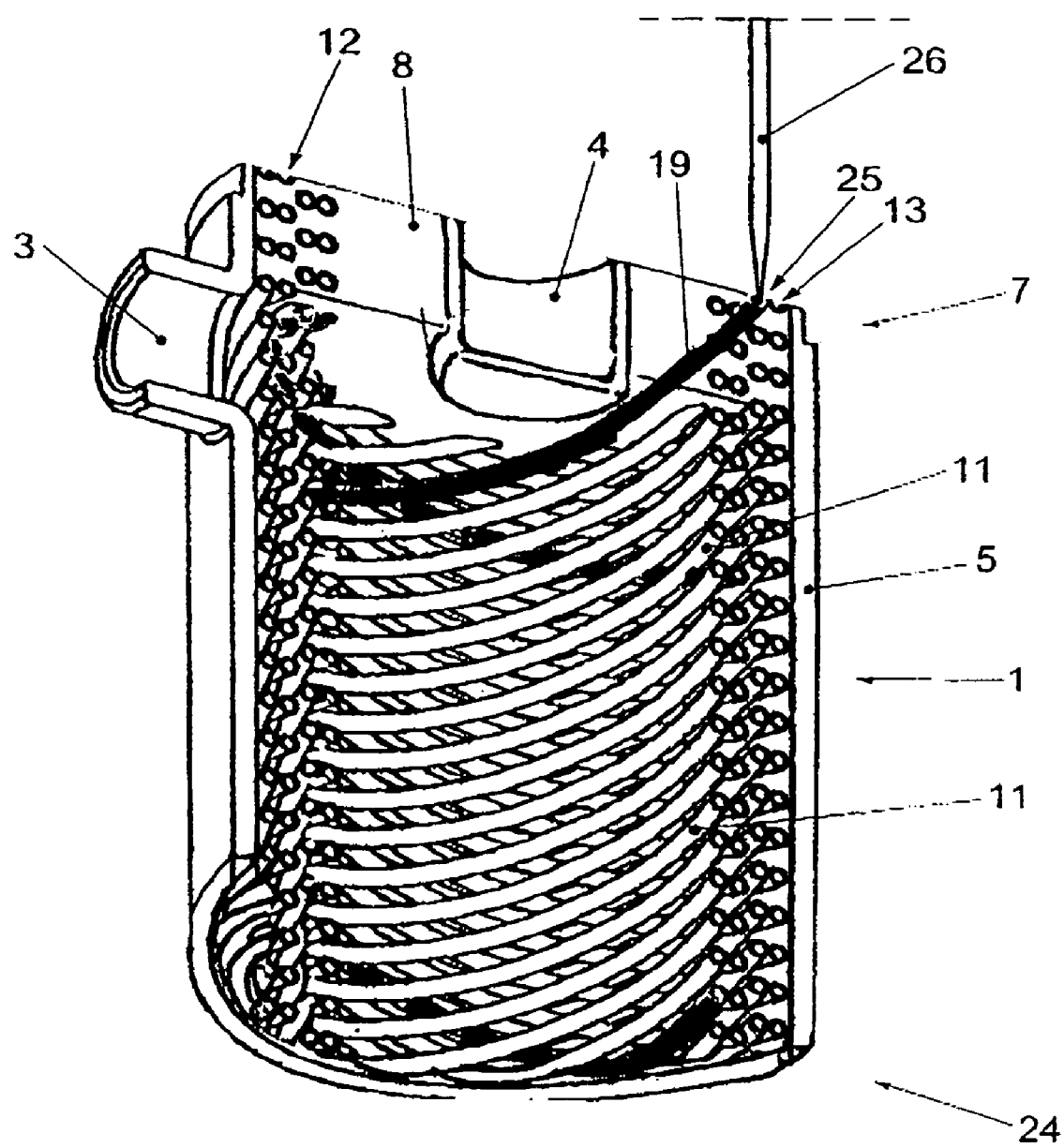
FIG. 6 shows a membrane filter according to the invention, with an alternative manner of hydrophobing a hydrophilic filter element.

FIG. 6 schematically shows an alternative embodiment of a method according to the invention, in which the membrane filter 1 is preferably held up by the first end 7, after which a hydrophobing liquid 25 is introduced via a first end 12 and/or second end 13 of at least one hydrophilic filter element 11 into the or each respective hydrophilic filter element 11, with the aid of, for instance, a needle 26, such that a hydrophobic filter membrane is obtained.

In an alternative embodiment, shown in FIG. 9, the hydrophilic filter elements 11 are secured in the bottom part 8 only by a first end 12, in a manner similar to that as shown in FIG. 2, with the opposite second ends 13 being left clear within the jacket 5, which ends 13 are closed off by, for instance, plugs 50 or the like, or are fixed in a cover part 23 and are closed off, such that water is prevented from flowing via these second ends into or out of the hydrophilic filter elements 11.

FIG. 10 shows a further alternative embodiment, of the cross-flow type. Here, the first 12 and second ends 13 of the fibers 11 have been potted in a bottom part 8 and 8A, respectively The housing 2 is provided at a first end with an inlet 3, in communication with an inlet space 9. On the opposite side, a second outlet opening 4B is provided, linking up with an outlet space 9A. The jacket 5 is provided with a first outlet opening 4A. The fibers 5 connect the inlet space 9 with the outlet space 9A, such that water can flow through the hollow fibers 11 directly from the inlet 3 to the second outlet 4B. In the housing, during use, preferably a reduced pressure is applied, so that a part of the fluid flowing through the fibers 11 is forced through the wall of the fibers 11 and can flow out of the outlet opening 4A. The water that flows directly through the outlet opening 4B can, for instance, be fed back to the inlet opening 3. Of course, the direction of flow can also be reversed, or water can be introduced through the outlet 4A, to be used as inlet, and be discharged via the ends 12, 13.

Also in the embodiments shown in FIGS. 9 and 10, in manners described earlier, air-permeable, watertight elements, in particular hydrophobic fibers or membranes, may be provided.

Materials that are suitable for hydrophobing fibers according to the invention are sufficiently known from practice and are described, for instance, in the above-mentioned US2002/0139095 and the publications mentioned therein, incorporated herein by reference.

FIG. 7 shows a top plan view, and sectional side elevation along the line A-A, of a shower head according to the invention, which shower head 30 is shown in FIG. 8 in exploded view. The shower head 30 comprises a housing 31 provided with a cylindrical head part 32 and a grip 33. The grip is provided, on the side remote from the head part 32, with a connecting element 34 and is of hollow design, such that water can flow via a passage 35 from the connection 34 to the head part 32. The head part 32 is closed at an upper side 36 and open at the opposite lower side 37, which side is closed by a closure secured thereon, for instance threaded head 38 with water passage apertures 39. To this extent, the shower 30 corresponds substantially to standard shower heads.

In the head part 32, a membrane filter 1 according to the invention is included, between the passage 35 in the grip 33 and the head 38 Water can flow from the connecting part 34 through the passage 35 to the head 38, at least the holes 39, solely via the membrane filter 1.

FIG. 8 shows the shower head 30 in exploded view. It shows the substantially cylindrical housing 2 which is open on both sides and, on the side 39 operatively proximal to the head 38, is provided with an outwardly extending flange 40. On the flange 40, on the side remote from the head 38, an 0-ring 41 may be placed which, upon placement of the membrane 1 in the head part 32, abuts against the free circumferential edge 42 of the open lower end 37, such that a watertight sealing is obtained.

In FIG. 8, on the left-hand side, the bundle 10 of hydrophilic elements 11 is represented as a cylinder, two rings 43 being shown for sealing and attachment. The open top of the jacket 2 can be closed off by a cover 23 provided with a central opening 44 through which water can operatively flow from the grip 33 into the membrane 1, at least between the fibers 11. As clearly shown in FIG. 7, in the membrane 1, inside of the fibers 11, a hydrophobic membrane 19 is provided, through which, during use, air can escape from the shower head 38. Alternatively, in the heart of the cylinder formed by the bundle 10 of hydrophilic elements 1, a cap 21 may be provided and, in a manner described earlier, a portion of the hydrophilic fibers may be hydrophobed.

With a shower, at least shower head 31, according to the invention, water can be simply filtered directly before it leaves the shower head 38 through the apertures 39, so that recontamination is simply prevented. After a particular period of service, or upon reaching a particular extent of contamination, the filter 1 can be simply replaced, so that a desired throughput is always obtained.

By way of illustration, a number of values for a filter membrane according to the invention are given, which should not in any way be construed as being limiting. The total membrane length of the fibers is, for instance, in the order of magnitude of 40 m, with a membrane surface area of approximately 0.1 $m^2$. The flow rate will vary between, for instance, 8 liters per minute at 1 bar, for a relatively clean filter, and approximately 3 liters per minute at 1 bar in the case of a filter at the end of its service life, although, of course, many other values are possible. Moreover, in a shower according to the invention, naturally, also other embodiments of the filters as shown can be included, for instance according to any one of FIGS. 1-4 and as described in the description.

According to an embodiment of a method according to the invention, a membrane filter is manufactured by successively potting hydrophilic filter elements, without functional hydrophobic filter element, subsequently optionally testing the leak tightness of the potting, preferably in a wet environment, and subsequently providing for at least one hydrophobic filter element, in a manner described earlier. Testing can be done, for instance, by providing water in the chamber 9 and subsequently supplying air from the opposite side of the bottom part 8. If potting has been done in the proper manner, no air bubbles will be formed in the water in the chamber 9. Naturally, such testing can also be done in other ways, for instance by applying a known excess pressure in the chamber 9 and/or the inner space of the housing 2 and checking whether this excess pressure is maintained independently, for if the potting has not been arranged correctly, the pressure will slowly fall as a result of air leaking out. Many comparable variations will be immediately clear to those skilled in the art. Precisely because a functional air passage through which no water can escape, in particular the hydrophobic filter element, is not provided until after this testing, no further special measures need to be taken during such testing.

A membrane filter 1 according to the invention can be combined with other filters, for instance pre-filters such as activated carbon. Optionally, a bacteria-retaining and/or killing means or a pre-filter such as for instance activated carbon can be included in a membrane filter 1, in particular between the hydrophilic and/or hydrophobic filter elements 11, 19, so that undesired changes in odor and taste of the water are prevented and reflux of bacteria and the like via the water inlet is prevented. In the exemplary embodiments shown, during use, water will flow from the water inlet 3 to the water outlet 4. As a consequence, the water will flow from the outer wall 14 to the inner space 15 of the fibers, which simply prevents the inner space from getting clogged. It will be clear, however, that the direction of flow can also be reversed.

It will be clear that in the same or a comparable manner, also other kinds of hydrophilic filter elements can be used in a membrane filter according to the invention, which can first be tested for airtightness, after which hydrophobic filter elements can be provided, for instance by partly hydrophobing the hydrophilic filter elements.

The invention is not limited in any way to exemplary embodiments shown in the description and in the drawing. Many variations thereon are possible within the scope of the invention outlined by the claims, for instance combinations of different parts of the embodiments shown and described.

The invention claimed is:

1. A method for manufacturing a membrane filter comprising:
 a hydrophilic filter part which comprises a bundle of hydrophilic elements which are each fixed by at least a first end in a bottom element, such that, during use, water passes the bottom element via said hydrophilic elements;

the bundle of hydrophilic elements being wound into a coil shape, such that therein a hollow space is enclosed next to the bottom element;

a hydrophobic filter part being watertight and air permeable formed as a portion of one or more of the hydrophilic elements to which is introduced a hydrophobing agent, such that air can pass said membrane filter via said hydrophobic filter part;

the method comprising the steps of:

fixing a bundle of hydrophilic filter elements by at least a first end in a housing part to be called bottom element, such that said first end of the hydrophilic filter elements is open towards a first side of said housing part and the hydrophilic filter elements extend on the opposite side of the housing part; and subsequently providing for at least one watertight and air-permeable element, in particular a hydrophobic filter element.

2. A method according to claim 1, wherein the or each watertight and air-permeable element is provided by hydrophobing at least a portion of at least one hydrophilic filter element.

3. A method according to claim 2, wherein hydrophobing is obtained by applying a hydrophobing substance, in particular liquid, on the outside of at least one hydrophilic filter element.

4. A method according to claim 2, wherein hydrophobing is obtained by applying a hydrophobing substance, in particular liquid, in at least one hydrophilic filter element.

5. A method according claim 4, wherein said substance, in particular liquid, is applied from said first end.

6. A method according to claim 1, comprising, after fixation of the bundle of hydrophilic elements, testing the attachment of the hydrophilic filter elements in the housing part through airtight locking of the housing part and checking whether air can pass through the housing part, alongside and/or through the hydrophilic filter elements and, upon proven airtightness, subsequently providing for at least one watertight and air-permeable element, in particular a hydrophobic filter element.

7. A method according to claim 1, wherein the housing part with the hydrophilic filter elements is included in a housing, provided with a water inlet and a water outlet, such that water can only flow from the water inlet to the water outlet via the hydrophilic filter elements, wherein in a part of the housing the watertight but air-permeable element, in particular said hydrophobic filter element, is arranged.

8. A method according to claim 7, wherein said watertight and air-permeable filter element is arranged in the housing part in which the first ends of the hydrophilic filter elements are included.

9. A method according to claim 1, wherein the hydrophilic filter elements are arranged adjacent an outer circumference of the bottom part, thereby leaving clear a central part of the bottom part, after which the bundle of hydrophilic filter elements is wound into a coil shape having a free inner space therein, contiguous to said central part, after which, hydrophobing of at least a portion of the hydrophilic elements is obtained from said inner space.

10. A method according to claim 1, wherein the hydrophilic filter elements are arranged adjacent an outer circumference of the bottom part, thereby leaving clear a central part of the bottom part, after which the bundle of hydrophilic filter elements is wound into a coil shape having a free inner space therein, contiguous to said central part, wherein said watertight and air-permeable element, in particular a hydrophobic filter element, is arranged in said central part.

11. A method according to claim 10, wherein a bottom part is used which is provided with at least one opening, which opening, during testing of the hydrophilic elements, is closed off airtightly and watertightly, in which opening said watertight and air-permeable element, in particular a hydrophobic filter element, is arranged.

12. A method according to claim 11, wherein said watertight and air-permeable element, in particular a hydrophobic filter element, is arranged after removal of the watertight closure.

13. A method according to claim 1, wherein for hydrophobing, use is made of a substance selected from the group of substances as PTFE, silicone, Fluorepel™.

14. A method according to claim 1, wherein at least between the hydrophilic elements a bacteria retaining and/or killing means is arranged, preferably after the hydrophilic elements have been tested and/or parts thereof have been hydrophobed.

15. A method according to claim 1, wherein the bundle of hydrophilic elements are fixed by the first and second end in the bottom part and wound.

16. A membrane filter, comprising:

a hydrophilic filter part which comprises a bundle of hydrophilic elements which are each fixed by at least a first end in a bottom element, such that, during use, water passes the bottom element via said hydrophilic elements;

the bundle of hydrophilic elements being wound into a coil shape, such that therein a hollow space is enclosed next to the bottom element; and a hydrophobic filter part being watertight and air permeable formed as a portion of one or more of the hydrophilic elements to which is introduced a hydrophobing agent, such that air can pass said membrane filter via said hydrophobic filter part.

17. A membrane filter according to claim 16, wherein the hydrophobic filter part is arranged in the bottom part, of a hydrophilic element.

18. A membrane filter according to claim 16, wherein between the hydrophilic and/or hydrophobic elements, bacteria-retaining and/or killing means are included.

19. A membrane filter according to claim 16, wherein the hydrophilic elements are elongated elements which are each fixed, by the second end situated opposite said first end, in a cover part and are watertightly closed off adjacent the second end, while between the bottom part and the cover part a circumferential wall is provided which watertightly closes off a chamber, a first water connection being provided in the circumferential wall or the cover part, and a second water connection being provided on the side of the bottom part remote from the chamber, the arrangement being such that water can only flow from the first to the second water connection or vice versa via the hydrophilic filter part and air can flow only via the hydrophobic filter part, the filter parts being so arranged that during use contaminations are filtered out of the water.

20. A membrane filter according to claim 19, wherein the bundle of hydrophilic elements extends substantially along the inside of the circumferential wall.

21. A membrane filter according to claim 16, wherein the hydrophilic elements are designed at least substantially as hollow cylindrical elements such as fibers.

22. A membrane filter according to claim 16, wherein the membrane filter is designed such that during use air will leave the membrane filter where the water will leave the membrane filter.

23. A membrane filter according to claim 16, wherein the hydrophobic filter part is arranged in the bottom part, for deaeration of the filter during use.

24. A membrane filter according to claim 16, wherein the hydrophobing agent is a liquid introduced to the portion of the one or more of the hydrophilic elements after the bundle of hydrophilic elements are each fixed in the bottom element.

25. A membrane filter according to claim 16, wherein the hydrophobing agent is selected from the group consisting of PTFE, silicone, Fluorepel ™.

26. A membrane filter according to claim 16, wherein the hydrophilic elements have second ends being fixed in the bottom element.

27. A membrane filter, comprising:
- a hydrophilic filter part comprising a bundle of hydrophilic elements being fixed by at least a first end in a bottom element, such that, during use, water passes the bottom element via the hydrophilic elements;
- the bundle of hydrophilic elements being wound into a coil shape, such that therein a hollow space is enclosed next to the bottom element;
- a housing enclosing the hydrophilic elements and being watertightly sealed around the bottom part to form a chamber and having a first water connection in a wall of the housing such that water can only flow from the first water connection to a side of the bottom element external to the chamber or vice versa via the hydrophilic filter part; and
- a water tight and air permeable hydrophobic filter part communicating with the chamber such that air can pass the membrane filter via the hydrophobic filter part.

28. The membrane filter according to claim 27, wherein the hydrophobic filter part is located in a wall of the housing.

29. The membrane filter according to claim 27, wherein the hydrophobic filter part is located in the bottom element.

30. A membrane filter according to claim 27, wherein the hollow space is formed in a central part of the membrane filter and the hydrophobic filter part is located in the central part.

31. A membrane filter according to claim 27, wherein the hydrophilic elements have a second end fixed in the bottom element.

32. A membrane filter according to claim 27, wherein the hydrophilic elements are elongated elements which are each fixed, by a second end situated opposite the first end in the housing and are water tightly closed off adjacent the second end.

33. A membrane filter according to claim 27, wherein the bundle of hydrophilic elements extends substantially along the inside of the housing.

34. A membrane filter according to claim 27, wherein the hydrophobic filter part is arranged to permit air to leave the membrane filter in a different direction than water is permitted to leave the membrane filter.

\* \* \* \* \*

UNITED STATES PATENT AND TRADEMARK OFFICE
CERTIFICATE OF CORRECTION

PATENT NO. : 7,465,393 B2  Page 1 of 1
APPLICATION NO. : 10/836611
DATED : December 16, 2008
INVENTOR(S) : Lucas Johannes Cornelis Kouters et al.

It is certified that error appears in the above-identified patent and that said Letters Patent is hereby corrected as shown below:

Column 3, line 58, "water In" should read --water. In--;

Column 4, line 34, "WO021076589" should read --WO02/076589--;

Column 7, line 34, "38 Water" should read --38. Water--;

Column 7, line 42, "0-ring" should read --O-ring--; and

Column 7, line 56, "1" should read --11--.

Signed and Sealed this

Ninth Day of June, 2009

JOHN DOLL
*Acting Director of the United States Patent and Trademark Office*